United States Patent [19]

Lester et al.

[11] 4,076,547

[45] Feb. 28, 1978

[54] POLYMERIC MOLDING COMPOSITION

[75] Inventors: David Lester, Arlington; Robert R. Alexander, Milford, both of Mass.

[73] Assignee: Polymerics, Inc., Waltham, Mass.

[21] Appl. No.: 693,023

[22] Filed: Jun. 10, 1976

[51] Int. Cl.$^2$ ............ C04B 11/00; C04B 11/24; C08L 1/08; C08L 1/00
[52] U.S. Cl. ............ 106/109; 106/115; 106/124; 106/157; 106/158; 106/189; 106/205; 106/210; 260/9; 260/13; 260/17.4 ST; 260/29.65; 260/29.6 B
[58] Field of Search ............ 106/109, 115, 189, 108

[56] References Cited

U.S. PATENT DOCUMENTS

| | | | |
|---|---|---|---|
| 2,716,615 | 8/1955 | Voris | 106/189 |
| 2,810,659 | 10/1957 | Greminger et al. | 106/189 |
| 3,282,265 | 11/1966 | Smith | 106/115 |
| 3,297,601 | 1/1967 | Maynard et al. | 106/109 |
| 3,304,190 | 2/1967 | Wielicki et al. | 106/189 |
| 3,468,685 | 9/1969 | Savage et al. | 106/189 |
| 3,485,651 | 12/1969 | Ganz | 106/185 |
| 3,640,741 | 2/1972 | Etes | 106/189 |
| 3,936,313 | 2/1976 | Ericson | 106/115 |

*Primary Examiner*—Herbert J. Lilling
*Attorney, Agent, or Firm*—James J. Cannon, Jr.

[57] ABSTRACT

A polymeric molding composition from water soluble compounds admixed from a two part wet phase and dry phase combination comprised from the interaction by nucleophilic substitution of an hydroxyl group of an alcohol, having more than one functional hydroxyl group, by a polymeric compound or by a polymeric hydroxyl compound hydrolyzed in a water solution wherein each monomer has an alkyl hydroxyl group, an hydroxyl group or other functional group capable of forming an alkoxide by means of the action of an alkaline earth metal salt electrolytic initiator to provide a self sustaining ionic reaction to create a fast forming polymeric composition which has an initial quick set time to form a flowable gel-like mass and which has a delayed set time to form a rigid non-sticky durable product. The dry phase includes a water solubilizing powder capable of forming a gel and the electrolytic initiator. The wet phase includes water as the solubilizing medium and a water soluble gel modifying substance.

16 Claims, No Drawings

4,076,547

POLYMERIC MOLDING COMPOSITION

FIELD OF THE INVENTION

The present invention relates to a polymeric molding composition formed through a self sustaining reaction by the nucleophilic substitution of an hydroxyl group of a diol or multi-hydroxyl alcohol by an alkoxide formed upon the monomer of a water solubilizing polymeric compound chain by the action of alkaline earth metal electrolytic salts.

DESCRIPTION OF THE PRIOR ART

The prior art is replete with attempts to find safe, nontoxic molding compounds for use by hobbyists in the various arts and crafts and for use by children in the form of toys and games. In the prior art it was assumed by those with knowledge of gel compositions based on polymeric water soluble compounds that such compounds were not suitable for making a practical molding composition. Most of such compounds are too slow to set and require tremendous mechanical energy input by means of heat, for example, to solubilize them. Once the gel state is achieved, by the previous art, it has no physical integrity and will not support its own weight or structural mass, and is therefore unsuitable for molding in a commercial setting.

The inventors have experimented extensively with polymeric compounds and products based on such compounds. They know of no prior polymeric molding compound which is formulated similarly to that of this invention. Thus to the best of the inventor's knowledge, no polymeric molding compound has been produced by a self-initiating and self-sustaining reaction.

One consideration of the present invention, as compared to prior art polymeric molding compositions from water soluble components, is the necessity that the polymeric molding composition be capable of a relatively quick set time from the liquid state to a gel state. It is also a consideration that the polymeric compound have a "delayed gel hardening time" after the initial molding set so that the configuration may be removed or extracted from the mold prior to final hardening, to be handleable and to retain its configuration for any subsequent modifying activities without undue loss of time. For example, if painting is desired, a more effective bond between the paint and composition will occur prior to final hardness. Thus, it is desired that the initial gel set time, due to the combination of components, will quickly form a mass which hardens to the extent that it can support its own weight and maintain its structural integrity as determined by the mold to lessen total product manufacturing time. Further, the initial gel set time after the admixing of components, for ease of handling and quantity of manufacture, can not be too long or short, the desired time being a time period which will be adequate for mixing the components thoroughly and which will allow the composition to have a good even liquid flow into the mold. The flow characteristics should be such to allow adequate conformation to all of the physical attributes of the mold and to allow good mold release after the initial mold set time.

To meet these problems by using water soluble compounds without energy input in a practical manufacturing molding operation, the present invention, as hereinafter described, utilizes compounds which are readily available and which are safe and easy to use. Various polymeric gel-forming carbonyl compounds may be used along with various electrolytic activating salts and various gel-modifying alcohols which have more than one functional hydroxyl group. Concern, therefore, had to be given to the relative concentrations of all components to obtain in the desired product a relatively quick setting structural polymeric compound. It is believed that the compound can be produced efficiently with a substantially reduced cost factor as compared to polymeric molding compositions produced which require energy input to activate formation.

SUMMARY OF THE INVENTION

In general, the basic components of the polymeric molding compound of the present invention are initially combined in the proper proportions into two separate phases, a powder phase and an aqueous liquid phase, which when combined, form a composition that converts from a liquid to a gel to a rigid, more or less permanent structure. As with all molding techniques, the final composition takes and retains the shape of the mold. The composition is attained by self-initiating and self-sustaining forced ionic dispersion bonding and nucleophilic substitution.

The primary basis of this invention is the discovery of a novel method and combination of polymeric water soluble compounds, alcohols and electrolytes, such that the final molding compound would first set and then harden to the extent that it could support its own weight and maintain its structural integrity once shaped in a mold. Furthermore, this setting and hardening has to be accomplished easily, without mechanical or heat input, and in such a time interval that is required for practical molding operations. The electrolyte is the functioning ingredient that hastens initial gel formation by solubilizing the polymeric water soluble compounds thru a salt or ionic dispersion force bonding. The electrolyte facilitates the nucleophilic substitution of an hydroxyl functional group of an alcohol, having more than one functional hydroxyl group, by a functional group of a monomer of the polymeric water soluble compound which creates the delayed gel set time. This causes the gel to be hardened or become more rigid in structure so that it can now support its own weight and maintain its structural integrity once shaped in a mold.

The powder phase contains two ingredients which together are inert but become active upon addition to the aqueous liquid phase. The powder phase combines a water solubilizing powder, which preferably is a polymeric carbonyl compound, such as hydroxyethyl-cellulose which has an alkyl-hydroxyl functional group on each monomeric glucose member. The reactive electrolytic salts are selected from the group of salts of the alkaline earth metals. These salts activate the polymeric hydroxyl compound which acts in relation thereto as a weak acid and loses a hydrogen ion to form an alkoxide which then induces the nucleophilic substitution of other reagents. It is known that such carbonyl compounds are prone to form gels in water solution and therefore the addition of the electrolyte hastens this process through the formation of the alkoxide ion and, hence, the quick initial gel set time.

The aqueous phase consists of water as the solubilizing medium and an alcohol having more than one functional hydroxyl group, preferably diols and triols. The function of the alcohol is to modify or control especially the delayed gel set time in combination with the electrolyte used. The alcohol will have an hydroxyl group substituted for nucleophilicly by the alkoxide ion and thus create a longer functional branch attached to the monomer which then is also capable of further alkoxide formation and nucleophilic substitution. This substitution and the rate thereof will determine the delayed gel set time and the extent of hardness of the final polymer.

Thus the final polymeric molding composition will have branched chains from the glucose structures which are initially randomly attacked and thereafter react randomly. The reactive alcohols may cross link cellulose chains to bind them together, for example, to achieve a firm final product. Also it is believed that some polymeric chains may simply bind to each other.

Thus the basis of the present invention is the proper combinations of the polymeric carbonyl compounds, electrolytes water and multi-hyroxyl alcohols to achieve a durable molded product which may be produced without energy input in such a time period that handicraft and commercial molding operations are feasible and rapid with safety and economy.

DESCRIPTION OF THE PREFERRED EMBODIMENT

The composition of this invention is composed of two parts, a powder part and an aqueous liquid part, which when combined in the proportions stated hereinafter, form a composition that converts from a smooth flowing liquid to a gel which will take and retain the shape of a mold. Depending upon the precise ingredients used, this gel will set to varying degrees of hardness.

The powder portion of this molding composition contains the active molding ingredients. It is a blend of a water solubilizing polymeric powder such as starch, modified starches, modified cellulosics, protein gums, modified protein gums, and water soluble synthetic compounds such as those derived from acrylic, polyvinyl alcohol and polyethers; and a gel forming initiating electrolyte or reactive compound such as sodium aluminum sulfate, potassium aluminum sulfate, calcium sulfate, sodium chloride, sodium sulfate, sodium bicarbonate, sodium carbonate, chromium potassium sulfate, chromium ammonium sulfate, calcium carbonate, aluminum suflate or its hydrates, potassium dihydrogen phosphate, trisodium phosphate, diammonium hydrogen phosphate, ammonium sulfamate, borax, calcium propinate, sodium acetate, calcium oxide, magnesium oxide, or potassium chloride.

The function of the polymeric solubilizing agent such as a modified starch, cellulosics and such is to provide the gel-body and thickening effect of the water phase. The polymeric water soluble compounds in sufficiently high concentration in water form a gel, however the rate of formation and the nature and physical attributes of these gels vary widely, depending upon the type used. In the present invention the water solubilizing polymer is selected from the group of compounds which have a functional branch upon each monomer unit of the polymer which is capable of forming an alkoxide ion. It has been found that the hydroxyl-ethyl functional group of cellulose provides the best results, however, acetylated starch will also provide the desired results. In the case of polyvinyl alcohol it is obvious that many available hydroxyl groups are open for attack to provide the formation of the alkoxide ion.

The alkaline earth metal salt electrolyte is the functioning ingredient that hastens the gel formation by solubilizing the polymeric water soluble compounds thru salt or ionic dispersion force bonding. This ionic bonding further creates a greater consistency or a more rigid structure so that the molding composition can now support its own weight and maintain its structural integrity once shaped in a mold due to the facilitation of the nucleophilic substitution reaction.

The aqueous portion consists of water as the solubilizing medium or solvent and gel modifiers such as ethylene glycol, glycerin, diethylene glycol, proproylene glycol, butalyene glycol, and the various low to high molecular weight glycols and alcohols. The gel modifiers modify initial gel set time but especially modify delayed gel set times, the flow characteristic and the final firmness of the molding composition. It has been found that diols and triols are most effective in brinding about the desired reaction of lengthening the functional branch chains of the polymeric water soluble compound of the powder phase to form various interconnections between the constituent compounds.

The following preferred embodiments are representative of the principles of the invention and are presented to elucidate the formulations possible and the acceptable range of variation of the components.

| Aqueous Phase | |
|---|---|
| Water | 140–210 parts |
| Glycerin | 70–128 |
| Colorant | 0.1–2.0 parts |
| Preservative | 0.1–3.0 parts |
| Perfume | 0.05–2.0 parts |
| Powder Phase | |
| Hydroxy Ethyl Cellulose | 35–85 parts |
| Calcium Carbonate (CaCO$_3$) | 9–14 parts |
| Sodium Bicarbonate (NaHCO$_3$) | 2.8–5.3 parts |

The final molding composition is made by blending the aqueous phase to the powder phase in the following percentile weight ratios.

| Aqueous Phase | 60–70–85% |
|---|---|
| Powder Phase | 40–30–14% |

It is also an intention, considering an intended end use, such as a toy for children's use, that this polymeric molding composition be made that it is safe for use as required by the provisions of the Federal Food & Cosmetic Act. The following composition conforms to this act, the colorants are dyes that are non-toxic and used for food coloring, and preservative and perfume or essential oils also conform to said Act. Within the ranges specified above, the following composition is the preferred embodiment.

The components of the aqueous phase are blended together in the following ratios.

| Water | 170.0 parts, wet |
|---|---|
| Glycerin | 110.0 |
| Colorant - Red Pigment | 1.0 |
| Preservative - Sodium Benzoate | 2.5 |
| Perfume | 0.5 |

This solution forms a clear, red (in this case) liquid which is watery in consistency and very easy to pour.

The components of the powder phase are admixed by a tumbling action until intimately mixed, in the following ratios -

| | |
|---|---|
| Hydroxy Ethyl Cellulose | 40 parts |
| Calcium Carbonate | 12 |
| Sodium Bicarbonate | 4 |
| Sodium Sulfate | 1.3 |
| Calcium Sulfate | 1.7 |

These dry components form an easy flowing white powder.

This aqueous part and the powder phase are blended together with agitation at the ratio of 75 parts of aqueous phase to 28 parts of the powder phase. This forms a moldable mass that is pliable, easy to work, that initially is watery, and pourable; at this initial pourable phase the mixture of the aqueous and powder phase is poured into the mold, and as such can take each minute detail of the mold in a very precise way. Then the moldable mass sets to a rigid gel, and within seconds this "set" mass becomes quite firm and is now handable, and may be transferred from the mold. The moldable liquid is smooth, and free of lumps, and will form into virtually any shape or form; the set mass is smooth, velvety, and free of air bubbles or lumps, it is nonstaining and will not harm furniture, clothing or hands; it is nontoxic, and although not recommended for eating, no harm is done if a child should eat a piece of it. The molded article may be painted with oil or water based paints, it may be left to dry, and it will not shrink, but maintain its original cast shape. As it ages, it becomes stronger, and develops into the hardness of a rubbery mass, that is quite resilient, and hence quite durable, so if dropped it will not readily break.

The chemical reactions which take place in the formulation are described by the following equations:

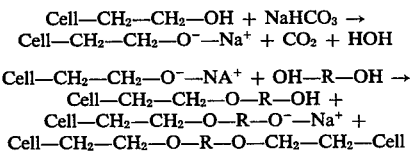

Thus the first equation describes the ionic salt reaction which first occurs to form the alkoxide upon the glucose member and hasten the inherent gel formation. The second equation illustrates the polymeric composition which is formed. Thus at this time it is again important to note the variety of chain linkages between monomers which may be made. First of all the attack upon the initial polymeric compound and the nucleophilic substitution is in a random manner which is dependent upon reagent concentrations. It should also be noted that the initial polymeric structure may be broken down at glycoside linkages to form shorter polymeric chains. Finally, it is important to note that delayed nucleophilic substitution occurs binding the final polymeric compound together in various permulations and combinations.

For formulations using a water soluble polymeric synthetic compound such as polyvinyl alcohol, the following equation is representative:

In either case the basic ionic salt reaction is the same, and the nucleophilic substitution of the alcohol of the prior second equation is the same to yield the polymer of the present invention. It should be noted that a combination of a synthetic compound and a cellusocic, for example, produce a very favorable final product.

It should be noted that the colorant, preservative and perfume take no part in the reaction. The colorant and perfume, of which there is no restriction, are added only for asthetic purposes. It should also be noted that any appropriate preservative may be used to make the composition.

Appended to this specification is a table of seventeen examples which are instructive and illustrative to the art of the present invention. It should be understood that these examples do not encompass all possible combinations of components. The inventor, therefore does not wish the present invention, with respect to the technology of a polymeric molding composition, to be strictly limited to such. Many of the functional ingredients may be interchanged, the ratios of the functional ingredients may be varied and the total mass ratios of the powder phase and liquid phase may be varied to produce the desired composition of the present invention without departing from the spirit thereof.

It is readily apparent that the above preferred formulation and several of the embodiments in the cited table utilize a combination of electrolytes. These combinations have been chosen chosen to modify the reaction rate. Primarily these act to modify the pH of the reaction to make sure the reaction will be self sustaining.

Also appended to this specification is a table of initial and delayed gel set times for the basic formulation and variations thereof. It is desirable that the initial gel set time occur thirty to sixty seconds after mixing to allow the composition to be poured into a mold. It is desirable that the delayed gel set time be four to six minutes to satisfy the requirements of the user. Again the variations of set times are dependent upon the type and quantity of reagents used and the relative reaction rates thereof.

The most important criteria beyond the total ratios are the type of gel-forming polymeric compound capable of forming an alkoxide and the amount of energy necessary to create the nucleophilic bonding which the electrolytic salt facilitates by ionic dispersion hydrolysis. The two foregoing formulations readily illustrate the principles of the parameters necessary to form the polymeric molding composition with respect to the 17 formulations in the appended table.

The inventor does not wish to be strictly limited to the foregoing formulations as can be readily observed many variations of reagents may be combined without departing from the spirit of the invention. The inventor therefore only wishes to be limited by the spirit and scope of the following claims.

LIST OF EXAMPLES

EXAMPLE NO. 1

| Aqueous Phase | Parts by Weight |
|---|---|
| Water | 50 |
| Glycerin | 50 |
| Powder Phase | |
| Polyvinyl Alcohol | 25 |
| Sodium Chloride | 2.5 |
| Blend Ratio 70/30 | |

EXAMPLE NO. 2

| Aqueous Phase | Parts by Weight |
|---|---|
| Water | 55 |
| 1,3 Butylene Glycol | 45 |
| Powder Phase | |
| Hydroxyl ethyl cellulose | 18 |
| Sodium Sulfate | 4 |
| Blend Ratio 65/30 | |

LIST OF EXAMPLES

EXAMPLE NO. 3

| Aqueous Phase | Parts by Weight |
|---|---|
| Water | 55 |
| Diethylene glycol | 45 |
| Powder Phase | |
| Hydroxyl ethyl cellulose | 22 |
| Sodium Carbonate | 3.5 |
| Blend Ratio 68/32 | |

EXAMPLE NO. 4

| Aqueous Phase | Parts by Weight |
|---|---|
| Water | 55 |
| Ethyl Alcohol | 10 |
| Diethylene glycol | 35 |
| Powder Phase | |
| Polyvinyl alcohol | 21 |
| Calcium Carbonate | 12 |
| Blend Ratio 65/35 | |

EXAMPLE NO. 5

| Aqueous Phase | Parts by Weight |
|---|---|
| Water | 45 |
| Glycerin | 45 |
| Propyl Alcohol | 10 |
| Powder Phase | |
| Hydroxy ethyl cellulose | 30 |
| Potassium aluminum sulfate | 2 |
| Sodium Barcarbonate | 1 |
| Blend Ratio 70/30 | |

EXAMPLE NO. 6

| Aqueous Phase | Parts by Weight |
|---|---|
| Water | 50 |
| Propylene Glycol | 50 |
| Powder Phase | |
| Polyvinyl alcohol | 25 |
| Sodium Chloride | 3 |
| Blend Ratio 70/30 | |

EXAMPLE NO. 7

| Aqueous Phase | Parts by Weight |
|---|---|
| Water | 65 |
| Glycerin | 20 |
| Butylene Glycol | 15 |
| Powder Phase | |
| Hydroxy ethyl cellulose | 25 |
| Sodium Sulfate | 1 |
| Sodium Bicarbonate | 3 |
| Blend Ratio 70/30 | |

EXAMPLE NO. 8

| Aqueous Phase | Parts by Weight |
|---|---|
| Water | 60 |
| Ethylene Glycol | 20 |
| Glycerin | 20 |
| Powder Phase | |
| Acetylated Starch | 27 |
| Diammonium phosphate | 3 |
| Sodium Acetate | 1 |
| Blend Ratio 65/35 | |

EXAMPLE NO. 9

| Aqueous Phase | Parts by Weight |
|---|---|
| Water | 75 |
| Butylene Glycol | 22 |
| Ethyl Alcohol | 3 |
| Powder Phase | |
| Carboxy methyl cellulose | 30 |
| Calcium sulfate | 0.5 |
| Calcium Carbonate | 7.0 |
| Calcium oxide | |
| Blend Ratio 60/40 | |

EXAMPLE NO. 10

| Aqueous Phase | Parts by Weight |
|---|---|
| Water | 68 |
| Butylene Glycol | 28 |
| Propyl Alcohol | 4 |
| Powder Phase | |
| Hydroxy ethyl cellulose | 30 |
| Calcium Carbonate | 7 |
| Ammonium sulfamate | 0.5 |

EXAMPLE NO. 11

| Aqueous Phase | Parts by Weight |
|---|---|
| Water | 60 |
| Glycerin | 35 |
| Ethyl Alcohol | 5 |
| Powder Phase | |
| Poly vinyl alcohol | 18 |
| Methyl cellulose | 10 |
| Borax | 2.7 |
| Potassium Chloride | 1.3 |
| Blend Ratio 68/32 | |

EXAMPLE NO. 12

| Aqueous Phase | Parts by Weight |
|---|---|
| Water | 70 |
| Glycerin | 30 |
| Powder Phase | |
| Hydroxyl ethyl cellulose | 30 |
| Calcium Carbonate | 12 |
| Blend Ratio 70/30 | |

EXAMPLE NO. 13

| Aqueous Phase | Parts by Weight |
|---|---|
| Water | 65 |
| Glycerin | 30 |
| Propylene Glycol | 5 |
| Powder Phase | |
| Hydroxyl ethyl cellulose | 28 |
| Calcium Carbonate | 12 |
| Sodium aluminum sulfate | 0.4 |
| Magnesium oxide | 0.5 |
| Trisodium phosphate | 1.1 |
| Blend Ratio 72/28 | |

EXAMPLE NO. 14

| Aqueous Phase | Parts by Weight |
|---|---|
| Water | 60 |
| Glycerin | 35 |
| Propylene Glycol | 5 |
| Powder Phase | |
| Carboxy methyl cellulose | 14 |
| Hydroxy ethyl cellulose | 14 |
| Borax | 1.3 |
| Sodium Chloride | 2.7 |
| Blend Ratio 73/27 | |

EXAMPLE NO. 15

| Aqueous Phase | Parts by Weight |
|---|---|
| Water | 40 |
| Butylene Glycol | 40 |
| Propylene Glycol | 20 |
| Powder Phase | |
| Hydroxyl ethyl cellulose | 20 |
| Acetylated starch | 20 |
| Potassium dihydrogen phosphate | 5 |
| Sodium Sulfate | 2 |
| Blend Ratio 67/33 | |

EXAMPLE NO. 16

| Aqueous Phase | Parts by Weight |
|---|---|
| Water | 65 |
| Butylene Glycol | 35 |
| Powder Phase | |
| Ethylated Starch | 30 |
| Potassium dihydrogen phosphate | 5 |
| Potassium chloride | 2 |
| Blend Ratio 69/31 | |

EXAMPLE NO. 17

| Aqueous Phase | Parts by Weight |
|---|---|
| Water | 70 |
| Glycerin | 30 |
| Powder Phase | |
| Hydroxy ethyl Cellulose | 35 |
| Potassium dihydrogen phosphate | 6 |
| Sodium sulfate | 1.4 |
| Sodium bicarbonate | 2.6 |
| Blend Ratio 73/27 | |

TABLE I
INITIAL AND DELAYED GEL SET TIMES
BASIC FORMULA

| | |
|---|---|
| Water | 170.0 parts |
| Glycerin | 110.0 parts |
| HEC | 40.0 parts |
| $CaCO_3$ | 12.0 parts |
| $NaHCO_3$ | 4.0 parts |

TABLE I-continued
INITIAL AND DELAYED GEL SET TIMES

| | | |
|---|---|---|
| NaSO₄ | 1.3 parts | |
| CaSO₄ | 1.7 parts | |

| Formula Variations | Initial Gel Set Time | Delayed Gel Set Time |
|---|---|---|
| Basic Formula | 43 secs | 4 min 37 secs |
| Basic+0.5 parts CaSO₄ | 2 min 4 secs | 5 min 23 secs |
| Basic+0.5 parts NaHCO₃ | 15 secs | 1 min 10 secs |
| Basic+0.5 parts NaHCO₃ +0.5 parts CaSO₄ | 50 secs | 5 min 44 secs |
| Basic+20 parts glycerin | 44 secs | 3 min 25 secs |
| Basic+40 parts glycerin | 41 secs | 2 min 05 secs |
| Basic+10 parts water | 3 min 11 secs | 11 min 45 secs |
| Basic+20 parts water | 5 min 13 secs | 15 min 17 secs |
| Basic+5 parts water +5 parts glycerin | 2 min 30 secs | 8 min 03 secs |
| Basic−3 parts CaCO₃ | 2 min 04 secs | 7 min 11 secs |
| Basic+3 parts CaCO₃ | 37 secs | 6 min 20 secs |
| Basic+3 parts CaCO₃ +0.5 parts NaSO₄ | 29 secs | 4 min 50 secs |
| Basic+0.5 parts NaSO₄ | 10 secs | 2 min 28 secs |
| Basic−0.5 parts NaSO₄ | 1 min 07 secs | 5 min 21 secs |
| Desirable limits | 30 sec to 1 min | 4 min to 6 min |

I claim:

1. A polymeric molding composition admixed to have a quick initial set time and to have a delayed set time comprising:
   a water soluble gel-forming polymeric compound selected from the group consisting of starches, modified starches and modified cellulosics, and having a functional group attached to a molecular unit having the ability to form an alkoxide;
   at least one electrolytic salt selected from the group consisting of alkaline earth metal salts to act as an ionic initiator in the formation of said alkoxide and to modify reagent reaction rates;
   a water-soluble gel-modifying alcoholic compound selected from the group consisting of diols, triols and other low to high molecular weight alcohols having more than one hydroxyl functional group; and
   water to act as a solubilizing medium wherein said composition includes:
   35–85 parts gel-forming polymeric compound by weight;
   7–19 parts alkaline earth metal electrolytic salts by weight,
   70–128 parts gel-modifying alcoholic compound by weight; and
   140–210 parts water by weight.

2. The polymeric molding composition of claim 1 wherein the group of gel-forming polymeric compounds includes saturated carbonyl compounds having an alkyl-carbonyl functionally capable of forming said alkoxide.

3. The polymeric molding composition of claim 2 wherein said saturated carbonyl functional group is selected from the group consisting of alkyl-hydroxyls having at least a two carbon chain.

4. The polymeric molding composition of claim 1 wherein the group of polymeric gel-forming compounds includes saturated carbonyl compounds having an acetylated functional group upon each polymer unit capable of forming said alkoxide.

5. The polymeric molding composition of claim 1 wherein the group of polymeric gel-forming compounds includes polymeric compounds, selected from the group consisting of starches, modified starches and modified cellulosics.

6. The polymeric molding composition of claim 1 wherein said gel-forming polymeric compound and said alkaline earth metal electrolytic salts are initially a dry phase mixture, and said gel-modifying alcoholic compound and said water are initially a wet phase, said dry phase being 15% to 40% of the precentile weight ratio of said wet phase.

7. A polymeric molding composition of claim 1, admixed to have an initial set time of 30 to 60 seconds and a delayed set time of 4 to 6 minutes comprising:
   35 to 85 parts water-soluble, gel-forming polymeric compound, having a functional group attached to a molecular unit, and being a polymer selected from the group consisting of starches, modified starches, and modified cellulosics;
   7 to 19 parts of at least one electrolytic salt selected from the group consisting of an alkaline earth metal salt to act as an ionic initiator in the formation of alkoxide and to modify reagent reaction rates;
   70 to 128 parts of at least one water-soluble gel modifying alcoholic compound selected from the group consisting of diols, triols and other low to high molecular weight alcohols having more than one hydroxyl furctional group;
   140 to 210 parts water to act as a solubilizing medium; and
   said gel-forming polymeric compound and said alkaline earth metal electrolytic salt being 15% to 40% of the percentile weight ratio of said gel-modifying alcohol and said water.

8. The polymeric molding composition of claim 7 wherein a water soluble gel-forming polymeric compound selected from the group consisting of starch, modified starches, and modified cellulosics;
   said alkaline earth metal electrolytic salts includes sodium aluminum sulfate, potassium aluminum sulfate, calcium sulfate, sodium chloride, sodium sulfate, sodium bicarbonate, sodium carbonate, chromium potassium sulfate, chromium ammonium sulfate, calcium carbonate, aluminum sulfate or its hydrates, potassium dihydrogen phosphate, trisodium phosphate, diammonium hydrogen phosphate, ammonium sulfamate, borax, calcium propionate, sodium acetate, calcium oxide, magnesium oxide, or potassium chloride; and
   said gel modifying alcoholic compound having more than one functional hydroxyl group includes, and is not limited to, ethylene glycol, glycerin, diethylene glycol, propylene glycol, butylene glycol.

9. The polymeric molding composition of claim 8 further including small amounts of colorant dyes, preservatives, perfumes and essential oils.

10. An admixed polymeric molding composition comprising;
   a powder mixture including:
   a water-solubilizing powder selected from the group consisting of starches, modified starches, and modified cellulosics; and
   at least one gel-forming electrolyte selected from the group consisting of sodium aluminum sulfate, potassium aluminum sulfate, calcium sulfate, sodium chloride, sodium sulfate, sodium bicarbonate, sodium carbonate, chromium potassium sulfate, chromium ammonium sulfate, calcium carbonate, aluminum sulfate or its hydrates, potassium dihydrogen phosphate, trisodium phosphate, diammonium hydrogen phosphate, ammonium sulfamate, borax, calcium propionate, sodium acetate, calcium oxide, magnesium oxide, or potassium chloride;

an aqueous solution including water; and a gel modifier selected from the group consisting ethylene glycol, glycerin, diethylene glycol, propylene glycol and butylene glycol wherein said composition includes 60 to 85 percent by weight of said aqueous solution and 15 to 40 percent by weight of said powder mixture.

11. The polymeric molding composition of claim 10, wherein said powder mixture includes:
hydroxy ethyl cellulose: 35 to 85 parts,
calcium carbonate: 9 to 14 parts,
sodium bicarbonate: 2.8 to 5.3 parts.

12. The polymeric molding composition of claim 10 wherein said aqueous phase includes:
water: 140 to 210 parts,
glycerin: 70 to 128 parts.

13. The polymeric molding composition of claim 10 wherein: the powder mixture consists of:
hydroxy ethyl cellulose: 40 parts,
calcium carbonate: 12 parts,
sodium bicarbonate: 4 parts,
sodium sulfate: 1.3 parts,
calcium sulfate: 1.7 parts;
the aqueous solution consists of:
water: 170 parts,
glycerin: 110 parts, and;
the composition consists of 28 parts of said powder mixture and 75 parts of said aqueous solution.

14. The polymeric molding composition of claim 13 wherein said composition is combined in the ratios comprising:
35 to 85 parts gel-forming polymeric compound;
7 to 19 parts alkaline earth metal salt electrolyte;
70 to 128 parts gel-modifying alcoholic compound;
140 to 210 parts water; and
said molding composition being formed through the admixing of 60 to 85 percent by percentile weight of said wet phase aqueous solution and 15 to 40 percent by percentile weight of said dry phase powder mixture.

15. The polymeric molding composition of claim 13 wherein: the dry phase powder misture consists of
hydroxy ethyl cellulose: 40 parts,
calcium carbonate: 12 parts,
sodium bicarbonate: 4 parts,
sodium sulfate: 1.3 parts,
calcium sulfate: 1.7 parts;
the wet phase aqueous solution consists of
water: 170 parts,
glycerin: 110 parts, and;
said admixed dry and wet phases consists of 28 parts of said powder mixture and 75 parts of said aqueous solution.

16. A process for making a polymeric molding composition by means of a self-sustaining reaction including forced ionic dispersion and nucleophilic substitution comprising:
thoroughly mixing a dry phase powder mixture of a water-soluble gel-forming polymeric compound, selected from the group consisting of starches, modified starches and modified cellulosics, and at least one electrolytic salt selected from the group consisting of alkaline earth metal salts;
thoroughly mixing a wet phase aqueous solution of water and at least one water soluble gel modifying alcohol selected from the group consisting of diols, triols and other low to high molecular weight alcohols having more than one hydroxyl functional group;
combining and thoroughly agitating said wet and dry phases for a short period; and
said molding composition having an initial gel set time of 30 to 60 seconds and a delayed molding set time of 4 to 6 minutes.

* * * * *